June 27, 1933.  G. R. BOTT  1,915,288
CAGE FOR BALL BEARINGS AND METHOD OF MAKING SAME
Filed Feb. 1, 1932

INVENTOR
George R. Bott
BY C. L. Gaepel
his ATTORNEY

Patented June 27, 1933

1,915,288

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

CAGE FOR BALL BEARINGS AND METHOD OF MAKING SAME

Application filed February 1, 1932. Serial No. 590,018.

This invention relates to an improved cage for ball bearings, and has for its general object and purpose, to provide a cage structure for retaining the balls in predetermined spaced relation which perhaps finds its greatest usefulness in connection with the double row type of ball bearings, though applicable to the single row type as well, and which comprehends certain novel features, whereby the assembly of the balls within the retaining or holding pockets of the cage ring may be accomplished with ease and facility and without subjecting the balls to frictional confining pressure having a tendency to retard the free individual rotation of the balls relative to the cage structure within the races of the bearing.

It is a more particular object of the invention to provide such a ball retaining cage for anti-friction bearings in which the cage ring is preferably die cast and provided with spaced ball receiving pockets opening on one lateral edge thereof and of greater depth than the diameter of the balls to be received therein, and said lateral edge face of the ring between the pockets having relatively thin projecting lugs thereon. Axially extending bores are formed through the cage ring structure from the opposite lateral edge thereof and terminate within the lugs, opening through the opposite side faces of said lugs. At the base of each bore, the lug is later deeply scored, thereby providing an easily fracturable relatively thin central web, whereby said lugs may subsequently be bifurcated by a suitable tool and the parts thereof circumferentially expanded in opposite directions and into embracing and retaining relation with the balls positioned in the adjacent cage ring pockets. It is an important feature of the invention that such bending or expansion of the lug parts takes place at the lateral edge face of the body of the cage ring, and therefore at a point which is spaced outwardly towards the open side of the cage pocket from the center of the ball. By the accurate formation of the expanding tools, such expansion of the bifurcated lugs may be very precisely controlled, and thus obviate cramping or binding pressure of the retaining lugs or the walls of the cage pockets upon the peripheries of the balls. Also, it may be observed that by the preliminary scoring of the lug at the base of the bore which receives the expanding tool, the bifurcation of the lug is easily effected and with a substantial absence of distortion of the cage structure. Accordingly, it will be seen that by a very simply performed expanding operation by means of a gang tool, all of the lugs on the cage ring may be simultaneously bifurcated and expanded to properly confine and retain the balls within the respective pockets, and without necessitating any further or subsequent manipulation of the parts to relieve the balls of excessive frictional or binding pressure.

The invention also has for an additional object to provide a cage structure as above characterized which admits of the proper assemblage of the balls in the cage pockets by a very simple and expeditiously performed method, and which structure will be strong and durable, unaffected by frictional heat in the operation of the bearing, and can be produced at comparatively small manufacturing cost.

With the above and other objects in view, my invention consists in the improved cage for ball bearings, and in the form, construction and relative arrangement of the several parts thereof, as will be hereinafter more fully described, illustrated in the accompanying drawing and subsequently incorporated in the subjoined claims.

In the drawing wherein I have disclosed a simple and practical embodiment of the invention, and in which similar reference characters designate corresponding parts throughout the several views,—

Fig. 9 is a fragmentary edge elevation showing a slightly modified form of the cage.

Figure 1:
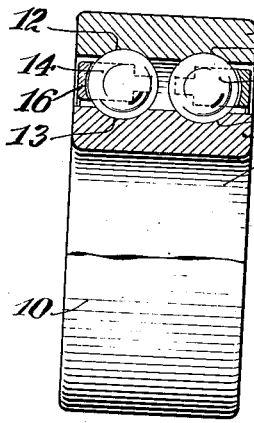
Figure 1 is an edge view, partly in section, showing one form of my improved cage as applied to a double row type ball bearing.
Figure 2:
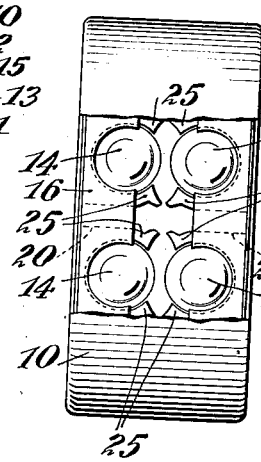
Fig. 2 is a plan view, the outer bearing ring being partly broken away.
Figure 3:
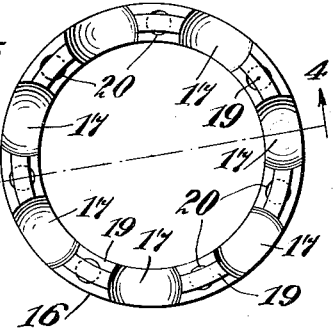
Fig. 3 is an inner side elevation of the cage before being assembled.

For purposes of illustration, I have shown my improved cage structure as applied to a double row type of ball bearing, in which the bearing rings 10 and 11 respectively are provided with the usual spaced race grooves 12 and 13 in their opposing surfaces of the laterally closed or unnotched type. These rings are assembled with the two sets of balls 14 and 15 by the well-known eccentric method in which the balls are placed in the race grooves of the rings prior to the application of the cages which retain the balls of each set in properly spaced relation to each other. It will, of course, be evident that these cages must be presented from the opposite outer sides of the bearing, and heretofore more or less difficulty has been experienced in the proper fitting of the cages with relation to the balls and adjustment of the cage parts, whereby the cage and balls are retained in permanently assembled relation, without such confining frictional pressure on the surfaces of the balls as necessitated subsequent additional manipulations of the cage parts which could be accomplished only with the greatest difficulty, and was generally attended by a more or less severe distortion of the cage structure.

My present invention obviates the above difficulties, and unlike certain devices of the prior art, may be employed in connection with small as well as large size ball bearings. As herein shown, the cage structure comprises a die cast annular body or ring 16 of bronze, brass or other metal and of the requisite diameter and wall thickness for the particular size of bearing to which the cage is to be applied. This body structure of the cage may be easily machined to provide the spaced ball receiving pockets 17, the walls of which may be of straight cylindrical form, though preferably concaved transversely of the cage structure on an arc concentric to the periphery of the ball to be received therein, as clearly shown in the drawing. The diametrical centers of the pockets 17, as indicated at 18, are inwardly spaced from the lateral edge face of the cage body 16, upon which the ball receiving pocket opens. Upon this edge face of the cage body and extending between the adjacent ball pockets 17, the relatively thin lugs 19 are formed. These lugs project axially from the ring body and their opposite end faces are formed to constitute continuations of the walls of the pockets 17.

Figure 5:
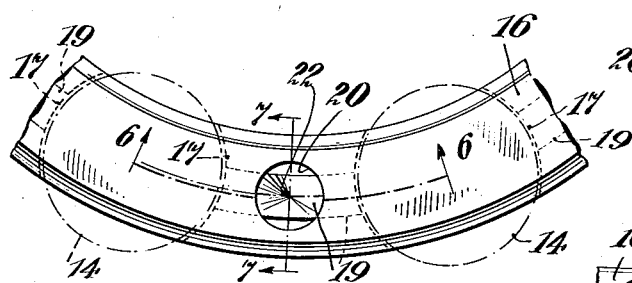
Fig. 5 is a fragmentary outer side elevation of the cage on an enlarged scale.
Figure 4:
Fig. 4 is a diametrical sectional view taken on the line 4—4 of Fig. 3.
Figure 6:
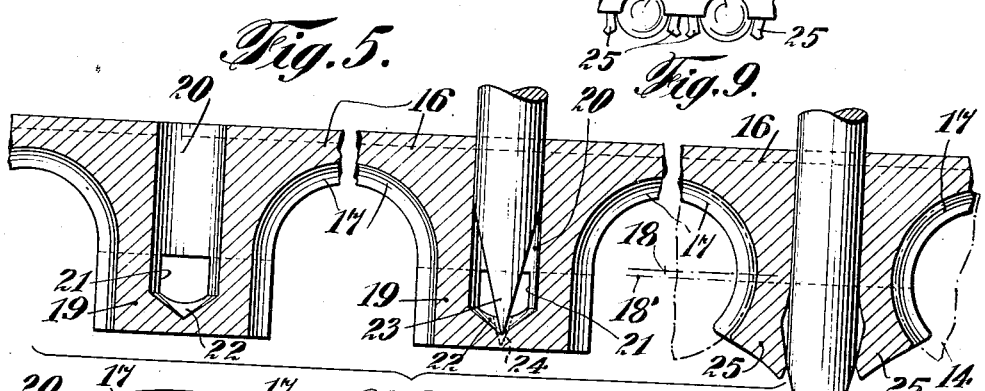
Fig. 6 is a circumferential sectional view through parts of the cage structure as indicated by the line 6—6 of Fig. 5, and showing the several operations whereby the bearing balls are retained in assembled relation within the cage pockets.
Figures 7, 8:
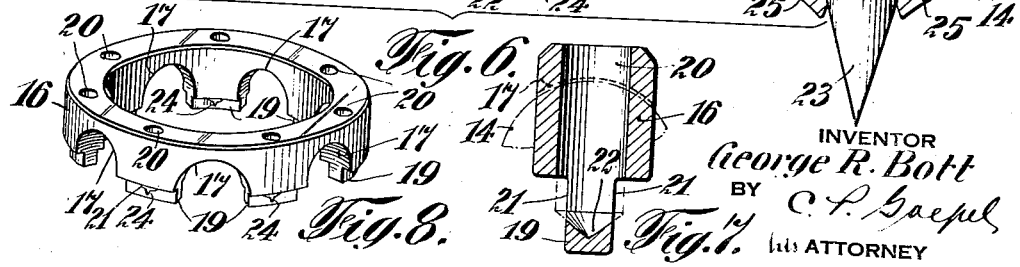
Fig. 7 is a sectional view taken on the line 7—7 of Fig. 5.
Fig. 8 is a perspective view of the cage.

The holes or bores 20 are drilled or cast axially in the cage structure from the other lateral edge face thereof and terminate within the lugs 19, as clearly shown in Fig. 5 of the drawing. The diameter of these bores exceeds the thickness of the lugs so that in the drilling operation, that portion of each bore extending into the lug 19 opens through the opposite side faces of the lug as indicated at 21. This end of the bore terminates in the usual tapering or inverted conical formation 22 produced by the drill.

After the bores 20 have been drilled, by means of a multiple tool, the chisel ended spindles 23 which enter each bore deeply score the end of the lugs 19 between the openings 21 as indicated in Fig. 5 at 24, thus leaving a very thin central web integrally connecting the two parts of the lugs, and likewise provides substantial abutments for later bifurcating and spreading.

It will now be apparent that after the cage as above described has been inserted between the bearing rings 10 and 11 at one side thereof and the bearing balls positioned in the respective pockets 17 of the cage, by means of the same multiple tool, the spindles 23 may be again inserted in the bores 20 and their chisel edges engaged with the thin central webs of the lugs 19, sufficient pressure being applied to rupture these webs. The chisel shaped ends of the spindles or spreaders are very accurately and precisely formed so that upon further movement of said spindles relative to the cage, the two parts of each bifurcated lug will be expanded circumferentially of the cage body in relatively opposite directions to a definitely predetermined extent. This expansion or bending of the lug parts takes place from the lateral edge face of the cage ring at the open sides of the pockets 17, and therefore along the line 18′ which is outwardly spaced from the center line 18 of the balls. This fact, in conjunction with the precisely controlled expansion operation, insures the complete freedom of each ball for turning or rotative movement in the respective cage pockets without cramping or binding thereof by the separated retaining fingers 25 formed by the bifurcated lugs 19. Accordingly, it will be evident that although this expanding operation may be performed by the machine tool with great rapidity, the degree of expansion of the lug parts is definitely limited, so that I avoid the creation of a condition of tightness or frictional resistance to the rotation of the balls. Also by previously scoring each lug 19 at its center, the rupture or bifurcation of these lugs and their expansion to embracing or encompassing relation to the balls does not produce any distortion in the cage structure, while the ball embracing and retaining fingers maintain definitely fixed or set positions with respect to the body of the cage and with relation to the ball surfaces.

As indicated in Fig. 9 of the drawing, it is not necessarily essential that the surfaces of the retaining fingers 25 opposed to the balls shall extend in concentric relation with the walls of the ball pockets or constitute continuations thereof, since, after the thin central web of the lug has been ruptured, by a relatively slight degree of expansion, the ball retaining fingers may be positioned relative to the open side of the ball pockets so as to effectually prevent the relative separation of the cage structure and the balls.

From the foregoing description, it will be appreciated that I have devised an improved cage or retainer for ball bearings which may be readily machined with a high degree of accuracy, and in which the assembling operation may also be very expeditiously and rapidly performed by means of simple tools with the assurance of complete freedom of rotation for each ball relative to the cage structure and without necessitating any further or subsequent adjustment or manipulation of the cage parts.

As a further economy in assembly of my new cage structure, it is possible that by relatively positioning two of the cages and properly aligning their bores 20, the lugs 19 of both cages may be bifurcated and the parts thereof expanded in one operation of the expanding tool, the elements 23 first operating upon the lugs of one cage from the open ends of the bores 20 therein, and then passing through the thin central web of the lugs on the other cage from the outer side thereof. It will further be clear that the mounting of this cage or retainer in assembled relation with the bearing balls will not in any way have a destructive effect on either the races of the bearing rings or on the ball surfaces, since in the rupturing and expanding operations, the resultant spreading or expanding pressure which is induced by the shape of the expanding tool is equally distributed in opposite directions which are not co-axial with the bearing axis. Further, such expanding pressure is internally resisted by the body structure of the cage or retainer. Owing to the fact that this structure is of uniform thickness, and that there are no internal or external flanges or protuberances on either its inner or outer surfaces, the cage structure may be readily fabricated for use in connection with the smaller sizes of ball bearings and with ample clearance between the inner and outer surfaces of the cage and the bearing rings. Therefore, even the smaller sizes of such cages will be of rugged and substantial construction and not liable to such distortion of its parts as might seriously affect the free rotation of the balls, either in the application of the cage, or as an incident to strains or stresses developing therein during the subsequent operation of the bearing.

From the foregoing description considered in connection with the accompanying drawing, the constructon, manner of use and several advantages of my improved cage or retainer for ball bearings will be clearly and fully understood. The device, in practical test, has given highly satisfactory results and been found to entirely obviate the practical disadvantages incident to the use of cages of this type as heretofore developed in the art, as previously noted herein. Although I have selected for purposes of illustration the particular cage construction which was applied and used in the making of this satisfactory test, it is apparent that within certain limits, the various parts of the cage structure may be modified as the requirements of particular practical applications of the device might require. Accordingly, it is to be understood that I reserve the privilege of incorporating the essential features of the present disclosure in such other alternative, structural forms as may be fairly embodied within the spirit and scope of the appended claims.

I claim:

1. A cage for ball bearings comprising an annular body structure having plain inner and outer surfaces and provided with circumferentially spaced ball receiving pockets opening upon one lateral edge of said body structure, and said lateral edge face of the cage body between said pockets being provided with lugs, each having a thin central rupturable web portion.

2. A cage for ball bearings comprising an annular body structure having plain inner and outer surfaces and provided with circumferentially spaced ball receiving pockets opening upon one lateral edge of said body structure, said lateral edge face of the cage body between said pockets being provided with lugs, each having a very thin central integral web portion, and said cage structure being further provided with bores extending axially therethrough and into the respective lugs for the reception of elements adapted to rupture said webs and circumferentially expand the separated parts of each lug in relatively opposite directions to position the same in embracing and retaining relation to the bearing balls in adjacent pockets.

3. A cage for ball bearings comprising an annular body structure having plain inner and outer surfaces and a plurality of circumferentially spaced ball receiving pockets opening upon one lateral edge of the cage body, the centers of said pockets being inwardly spaced from the plane of said lateral edge face of the cage body; and said edge face having relatively thin lugs projecting therefrom between the pockets axially of the cage body, and each lug having a thin central web portion adapted to be ruptured whereby the separated parts of the lug may be circumferentially expanded from the edge face of the cage body into embracing and retaining relation with the bearing balls in adjacent pockets.

4. A cage for ball bearings comprising an annular body structure having plain inner and outer surfaces and a plurality of circumferentially spaced ball receiving pockets opening upon one lateral edge of the cage body, the centers of said pockets being inwardly spaced from the plane of said lateral edge face of the cage body, said edge face having relatively thin lugs projecting therefrom between the pockets axially of the cage body, said cage body being also provided with spaced bores extending axially therethrough from its other lateral edge face and into the respective lugs, said bores opening through the opposite side faces of the lugs, and each lug at the center thereof and in line with the respective bores having a thin rupturable web portion adapted to be ruptured by a suitable tool to bifurcate the lug and expand the separated portions thereof into embracing and retaining relation with the bearing balls in adjacent pockets.

5. A cage for ball bearings comprising an annular die cast body of uniform thickness, said body provided with circumferentially spaced ball receiving pockets opening upon one lateral edge face of said body and having their centers located intermediate of the opposite lateral faces of said cage body, and comparatively thin lugs integral with the cage body centrally projecting from said edge face thereof between the open sides of adjacent pockets and adapted to be bifurcated and the parts thereof expanded in relatively opposite directions from their juncture with the cage body to close the open sides of said pockets and retain the balls therein.

6. The method of assembling bearing balls in a die cast cage ring having spaced ball receiving pockets opening upon one lateral edge thereof and of greater depth than the diameter of the balls, and said cage ring also having relatively thin lugs projecting from said lateral edge and extending continuously between the adjacent pockets; which consists in positioning the balls within the pockets, and then bifurcating the lugs and simultaneously expanding the separated parts of said lugs in opposite circumferential directions independently of the cage body into embracing relation to the balls in adjacent pockets.

7. The method of assembling bearing balls in a cage ring having ball receiving pockets opening upon the inner and outer sides and one lateral edge face of the ring; which consists in providing a single relatively thin laterally projecting lug upon said edge face of the ring between adjacent pockets, placing the balls within said pockets, and then rupturing said lugs to bifurcated members and simultaneously expanding the parts thereof circumferentially of the ring and in opposite directions independently of the cage body into embracing relation to the bearing balls in adjacent pockets.

8. The method of preparing a retaining cage for the assemblage of bearing balls therein, said cage consisting of a die cast ring having circumferentially spaced ball receiving pockets opening upon one lateral edge face thereof, and integrally formed relatively thin lugs projecting laterally from the ring between said pockets; which consists in forming bores in the cage structure extending axially thereof from the other lateral face of the cage ring and terminating within said lugs, and then internally scoring each lug at the latter end of the bore to provide a relatively thin rupturable web connecting spaced parts of the lug, whereby said lug parts may be relatively expanded by the movement of an expanding tool through said bore to close the open sides of adjacent pockets and retain the balls therein.

9. A cage for ball bearings comprising an anular cast metal body having uninterrupted inner and outer surfaces and provided with spaced ball receiving pockets opening upon one lateral face of said cage body, parts projecting from said face of the cage body between adjacent pockets, of less thickness than the body of the cage, and connected with each other by a thin web portion easily rupturable by the axial movement of a tool adapted to cooperate with the separated parts to expand the same in relatively opposite directions into embracing relation to the bearing balls in the adjacent pockets.

10. A cage for ball bearings comprising a body structure with circumferentially spaced ball receiving pockets opening upon one face of said cage body, said ball receiving pockets in respect to said face being deeper than the radius of the balls to be received therein, lugs between said pockets extending from said face of the cage body, each of said lugs being provided with a bore terminating in oppositely disposed projections on the members forming the end of the lug, said extending members of the lugs being bent away from each other and from the bore towards the ball receiving pockets to complete the same and hold the balls therein.

11. A cage for ball bearings comprising an annular body of uniform thickness bounded by concentric inner and outer circumferential faces and parallel side faces, one of said side faces being provided with a plurality of circumferentially spaced ball receiving curved pockets opening upon said side face, and providing spaced abutments between said pockets, and said pockets having their centers located intermediate of the parallel side faces and intermediate of the concentric circumferential faces, lugs extending from said spaced abutments at the side face thereof and disposed between the open faces of said pockets, the opposed parallel side face being provided with spaced bores extending from said last named side face through the abutments intermediate of the pockets and to the opposed side face thereof, the free ends of the lugs having opposed angular projections at one side thereof, said lugs being bent at a point at one side of the aforesaid centers, the side nearest the ends of the lugs to extend in continuation of the curved ball receiving pockets to enclose the balls.

In testimony that I claim the foregoing as my invention, I have signed my name hereto.

GEORGE R. BOTT.